United States Patent [19]

Ilmaier et al.

[11] 4,035,476

[45] July 12, 1977

[54] PROCESS FOR THE PREPARATION OF AGGLOMERATED VANADIUM OXIDES

[75] Inventors: Bernard Ilmaier; Wolfgang Mayer, both of Treibach, Austria

[73] Assignee: Treibacher Chemische Werke Aktiengesellschaft, Treibach, Austria

[21] Appl. No.: 658,474

[22] Filed: Feb. 17, 1976

[30] Foreign Application Priority Data

Feb. 21, 1975 Austria ............................... 1359/75

[51] Int. Cl.$^2$ ..................................... C01G 31/00
[52] U.S. Cl. ................................................ 423/592
[58] Field of Search .......... 423/592; 75/129, 134 V

[56] References Cited

U.S. PATENT DOCUMENTS 2,776,871  1/1957  Kelly, Jr. ............................. 423/592
3,410,652  11/1968  Hausen et al. ..................... 423/592

FOREIGN PATENT DOCUMENTS 749,866  1/1967  Canada ................................ 423/592

OTHER PUBLICATIONS

Satava, "Collection Czechoslov. Chem. Commun." vol. 24, 1959, pp. 2172–2181.

*Primary Examiner*—Herbert T. Carter
*Attorney, Agent, or Firm*—Kurt Kelman

[57] ABSTRACT

Agglomerated vanadium oxides of the formula $V_2O_x$, wherein $x$ is between 3.8 and 4.6, are prepared by thermally decomposing ammonium polyvanadate at 600°–900° C and permitting the resultant solid decomposition products and reducing gases to react. The reducing gases displace the air and/or scavenging gas in the reaction zone.

9 Claims, No Drawings

PROCESS FOR THE PREPARATION OF AGGLOMERATED VANADIUM OXIDES

The present invention relates to a process for the preparation of agglomerated vanadium oxides of the formula $V_2O_x$, wherein x has a value of 3.8 to 4.6, preferably 4.0 to 4.3, which are particularly suitable for the preparation of ferrovanadium.

Pure, finely divided vanadium trioxide, $V_2O_3$, is manufactured from ammonium meta-vanadate, $NH_4VO_3$, according to Austrian Pat. No. 276,296 by heating the vanadate in a reaction zone at temperatures of 580° C to 950° C. The reaction is highly complex. It is assumed that the following products are formed side by side as intermediate reaction products: ammonium hexavanadate, $(NH_4)_2V_6O_{16}$; ammonium vanadyl vanadate, $(NH_4)_2O.2V_2O_4.5V_2O_5$; oxides of the formula $2V_2O_4.V_2O_5$ and, by reduction at a temperature of 480°–500° C, vanadium tetroxide, $V_2O_4$. Separating the oxides $2V_2O_4.V_2O_5$ or $V_2O_4$ is neither possible nor contemplated.

It is known from Austrian Pat. No. 222,623 and generally practiced to decompose ammonium polyvanadate by heating the same in the presence of an excess of air, i.e. an oxidizing atmosphere, and to convert it thus into vansdium pentoxide powder. This powder must then be molten in a subsequent operating stage and shaped into platelets before it can be used to prepare ferrovanadium.

According to this invention, vanadium oxides of the formula $V_2O_x$, wherein $x$ is 3.8 to 4.6, are prepared by thermally decomposing ammonium polyvanadate in a reaction zone at temperatures from about 600° C to 900° C, preferably 680°–800° C, to obtain reaction products including solid decomposition products and reducing gases, and permitting the solid decomposition products to react with the reducing gases, the reducing gases displacing the ambient atmosphere of air and/or scavenging gas in the reaction zone.

In this process, the ammonia content in the starting material is used for the preparation of reduced vanadium oxides and unexpectedly bulbous agglomerated products are obtained at reaction temperatures which are low in relation to the high melting point of $V_2O_4$.

In contrast to vanadium trioxide or tetroxide powders, the agglomerated vanadium oxides produced in the process of the invention are not subject to dusting and corresponding raw material losses are largely avoided, in addition to being more easily handled than powders and less damaging to the environment, the agglomerated vanadium oxides of the indicated formula being less toxic. Furthermore, the velocity of oxidation during heating in the presence of air is much smaller with the agglomerated products than with powders since the former have a smaller surface. Therefore, the products of the present invention are substantially more stable.

In addition to the above advantages, preparing ferrovanadium from an agglomerated product of the formula $V_2O_{3.8-4.6}$ provides other improvements over $V_2O_5$ or $V_2O_3$ as the starting material. Compared with $V_2O_5$, much less reducing agent (for instance aluminum) is required while a much stronger exothermic reaction takes place than with $V_2O_3$, because of the higher oxygen content in the starting material, thus facilitating the conversion to ferrovanadium.

The water content of the starting material ammonium poly(hexa)vanadate of the general formula $(NH_4)_2.O.3V_2O_5.nH_2O$ is of no importance; only the ratio of ammonium to vanadium content is important in the preparation of the desired reduced vanadium oxides. The pure starting product has the formula $(NH_4)_2.O.3V_2O_5$ or $(NH_4)_2O.3V_2O_5.2H_2O$. Commercially available ammonium polyvanadates have a composition slightly varying from those of the pure product, a typical analysis of a product dried at a temperature of 100° C showing the following composition:

48–51% V
5.2–5.9% $NH_3$
0.1–0.5% $Na_2O$

Materials meeting this analysis are useful for the process of this invention and are encompassed by the term "ammonium polyvanadate", used herein. The nitrogen- and water vapor containing reaction products of these materials during their thermal decomposition displace the ambient atmosphere in the reaction zone, whether it is air or any other oxidizing scavenging gas introduced into the reaction vessel, and prevent such oxidizing gases from penetrating into the reaction zone.

When the reaction is continuous, the evolving nitrogen and water vapor gases suffice to obtain the desired result.

It is not necessary for the process of this invention to proceed in an absolutely oxygen-free atmosphere. The desired sintering and agglomeration may proceed with a composition of $V_2O_{4.0-4.3}$ which means that a loss of reducing gases from the amount that would be produced from the pure starting material may be tolerated. Sintering and agglomeration will also be obtained with an average composition of $V_2O_{3.8-4}$ or $V_2O_{4.3-4.6}$ provided the heating proceeds so quickly that no phase equilibrium is effected.

Preferably, a small amount of an inert gas is used.

Agglomerated products may be contacted by air at temperatures up to 300° C without any noticeable oxidation.

In accordance with preferred embodiments of the invention, the reaction proceeds continuously, the reducing gases are passed through the reaction zone in the same direction as the solid decomposition products, and the reaction products are agitated during the reaction. The upper and lower temperature limits are essential to obtain agglomerated products and a preferred temperature range is 650°–800° C, especially 680°–800° C.

The following examples illustrate the process of the present invention but are not considered to be limitative.

EXAMPLE 1

Two hundred grams of ammonium polyvanadate (50.7% V and 5.7% $NH_3$, by weight) were heated to a temperature of 750° C in a quartz tube without first removing the air therefrom. Water vapor and nitrogen were produced as gaseous reaction products. After cooling and washing with a little nitrogen, 170 g of a dark, sintered, agglomerated product were removed from the tube. The product contained, by weight, 59.5% V. No ammonia or nitride was found in the product.

A small test sample was exposed to air at a temperature of 550° C to calculate the average composition of the product as $V_2O_{4.17}$.

EXAMPLE 2 vanadium

Five kilograms per hour of ammonium polyvanadate (49.1% V and 5.6% $NH_3$, by weight) were continuously fed into a rotary kiln (5 rpm) and were heated in the absence of air to a temperature of 730° C. The product was cooled in a cooling zone to about 300° C and removed. The gases flowed in the same direction as the product and escaped into the atmosphere at the discharge end. The diameter of the kiln was 100 mm and the heated reaction zone had a length of 800 mm.

The reaction product was dark grey, primarily bulbous and pelletilized. Heated to 550° C, a powdered sample was calculated to have an average composition of $V_2O_{4.18}$. The grain distribution was as follows: 53%, by weight, 10 to 30mm; 40.7%, by weight, 1 to 10 mm; 3.0%, by weight, 0.06 to 1.0 mm; and 3.3%, by weight, smaller than 0.06 mm.

What is claimed is:

1. A process for the preparation of agglomerated vanadium oxides of the formula $V_2O_x$, wherein $x$ has a value of 3.8 to 4.6, comprising the steps of thermally decomposing ammonium polyvanadate in a reaction zone at temperatures from about 600° C to 900° C to obtain reaction products including solid decomposition products and reducing gases, the ammonium polyvanadate containing, by weight, 48 – 51% V, 5.2 – 5.9% $NH_3$ and 0.1 – 0.5% $Na_2O$, and permitting the solid decomposition products to react with the reducing gases, the reducing gases displacing the ambient atmosphere in the reaction zone.

2. The process of claim 1, wherein $x$ is 4.0 to 4.3.

3. The process of claim 1, wherein the ambient atmosphere is air.

4. The process of claim 1, wherein the ambient atmosphere is a scavenging gas.

5. The process of claim 1, wherein the temperatures range from 680° C to 800° C.

6. The process of claim 1, wherein the reducing gases and the solid decomposition products are passed through the reaction zone in the same direction.

7. The process of claim 1, wherein the reaction is continuous.

8. The process of claim 1, wherein the reaction products are agitated during the reaction.

9. The process of claim 1, wherein the temperatures range from 650° C to 800° C.

* * * * *